(12) United States Patent
Vannucci (10) Patent No.: US 8,292,047 B2
(45) Date of Patent: Oct. 23, 2012

(54) HYDRAULIC VARIABLE SHOCK ABSORBER WITH FLOW CONTROL VALVE

(75) Inventor: Sergio Nelo Vannucci, Sao Paulo (BR)

(73) Assignee: Magneti Marelli Cofap Companhia Fabricadora de Pecas, San Andrea (BR)

( * ) Notice: Subject to any disclaimer, the term of this patent is extended or adjusted under 35 U.S.C. 154(b) by 261 days.

(21) Appl. No.: 12/734,713

(22) PCT Filed: Nov. 19, 2008

(86) PCT No.: PCT/IB2008/003140
§ 371 (c)(1),
(2), (4) Date: Aug. 16, 2010

(87) PCT Pub. No.: WO2009/066155
PCT Pub. Date: May 28, 2009

(65) Prior Publication Data
US 2010/0300822 A1   Dec. 2, 2010

(30) Foreign Application Priority Data
Nov. 19, 2007   (BR) ..................................... 0705277

(51) Int. Cl.
*F16F 9/34* (2006.01)
(52) U.S. Cl. .............. 188/266.6; 188/266.5; 188/322.13
(58) Field of Classification Search ............... 188/266.5, 188/266.6, 322.13, 322.22
See application file for complete search history.

(56) References Cited

U.S. PATENT DOCUMENTS

| | | | | |
|---|---|---|---|---|
| 5,301,776 | A | 4/1994 | Beck | 188/322.13 |
| 5,303,804 | A * | 4/1994 | Spiess | 188/266.5 |
| 5,398,787 | A * | 3/1995 | Woessner et al. | 188/266.6 |
| 6,079,526 | A * | 6/2000 | Nezu et al. | 188/266.6 |
| 6,092,011 | A | 7/2000 | Hiramoto | 701/37 |
| 7,743,896 | B2 * | 6/2010 | Vanhees et al. | 188/322.13 |

FOREIGN PATENT DOCUMENTS

| | | |
|---|---|---|
| BR | 8506757 A | 7/1987 |
| GB | 2159234 A | 11/1985 |
| GB | 2164723 A | 3/1986 |
| JP | 2004301182 A | 10/2004 |

* cited by examiner

*Primary Examiner* — Christopher Schwartz
(74) *Attorney, Agent, or Firm* — Volpe and Koenig, P.C.

(57) ABSTRACT

The control valve is applied to a shock absorber, which comprises: a pressure tube (10); a piston (14) dividing the pressure tube (10) in compression and traction chambers (CC, CT) communicating with each other through the piston (14); a hydraulic fluid reservoir (20) provided with a selective bidirectional fluid communication with the compressor chamber (CC). The control valve (VC) communicates the traction chamber (CT) with the reservoir (20) and comprises a tubular body (40) provided with at least one radial passage (41) opened to the interior of the tubular body (40) and to the reservoir (20); a shutter pin (60) to be axially displaced within the tubular body (40), between a closing position and different open positions of the control valve (VC) for communicating the traction chamber (CT) with the reservoir (20); and an actuator means (A) for axially displace the shutter pin within the tubular body (40).

17 Claims, 5 Drawing Sheets

HYDRAULIC VARIABLE SHOCK ABSORBER WITH FLOW CONTROL VALVE

PRIORITY CLAIM

This application claims priority under 35 USC §365 to BR Patent Application PI0705277-4 (filed 19 Nov. 2007) and PCT/IB2008/003140 (filed 19 Nov. 2008).

FIELD OF THE INVENTION

The present invention refers to a valve to be applied to a hydraulic shock absorber, particularly a hydraulic shock absorber for wheeled transport vehicles, in order to allow controlling the hydraulic fluid flow in the shock absorber and, thereby, the variation in the damping force to be produced by the shock absorber, in both the compression and traction directions.

PRIOR ART

There are well known from the prior art the double-acting hydraulic shock absorbers, usually employed in suspension systems of automobile vehicles and which comprise a pressure tube inside which a piston is slidably mounted, dividing the pressure tube in an inferiorly disposed compression chamber and in a superiorly disposed traction chamber. The pressure tube has a lower end closed by a valve plate provided with a pair of passages, one of which housing a discharge valve and the other an admission valve, the upper end of the pressure tube being closed by a sealing annular plate, through which is axially displaced a rod, whose end internal to the pressure tube is attached to the piston.

The discharge and admission valves allow the compression chamber to present a restrict fluid communication with a hydraulic fluid reservoir, generally defined around the pressure tube, during the compression and expansion displacements of the shock absorber, respectively.

It also well known from the prior art the provision of a piston with a compression valve and a traction valve, which establish respective restrict fluid communications between the compression and traction chambers, upon the compression and expansion displacements of the shock absorber.

In these shock absorbers, the discharge valve operates jointly with the compression valve in the piston, in order to allow, during the compression displacement of the shock absorber, the hydraulic fluid to flow, simultaneously and restrictively, from the compression chamber to the fluid reservoir and to the traction chamber. In a similar way, the admission valve operates together with the traction valve in the piston, to allow, during the expansion displacement of the shock absorber, the hydraulic fluid to flow, simultaneously and restrictively, from the hydraulic fluid reservoir and from the traction chamber, to the interior of the compression chamber which is being expanded with the upward displacement of the piston.

In these shock absorbers, the degree of damping or rigidity of the shock absorber is fixed and defined by the dimensioning, already in the production, of the fluid communications between the traction chamber and the compression chamber and between the latter and the hydraulic fluid reservoir. The user or the manufacturer himself cannot vary the degree of damping after the manufacture of the shock absorber.

In order to eliminate the operational deficiency mentioned above, there were proposed the hydraulic shock absorbers capable of having their degree of damping modified by the manufacturer or assembler during the mounting of the shock absorber or by the user himself, during the operation of the vehicle in which they are installed.

In these known hydraulic shock absorbers with variable degree of damping, a selective fluid communication is provided between the traction chamber and the hydraulic fluid reservoir, this fluid communication being provided with a control valve to permit the user to vary the degree of restriction imposed to the hydraulic fluid flow to be impelled, by pressure differential, through said fluid communication, from the traction chamber to the hydraulic fluid reservoir, both in the compression displacement and in the expansion displacement of the shock absorber.

Although allowing adjusting the degree of damping (reaction force) of the hydraulic shock absorber, the known control valves are electromagnetically driven, for example, in an on-off system of a relatively simple construction, but which permits only two different operation conditions for the shock absorber, one of them with the control valve being closed and with the shock absorber operating in a more rigid manner, and the other condition with the valve being fully open and the shock absorber operating in a less rigid manner.

There are also the electromagnetic actuators which operate in a stepped manner, to allow different closing conditions for the control valve and, accordingly, different regulations for the shock absorber. However, the construction of these actuators is complex and costly.

Even the attempts for providing control valves with their actuation defined by the controlled displacement of a shutter have presented difficulties for avoiding even small leakages of the hydraulic fluid, and also for providing an adequate control having high sensitivity in relation to the responses to be obtained from the shock absorber when submitted to different operation conditions regarding the speed of the vehicle and the load thereon, and also the conditions of the road on which the vehicle is running.

The hydraulic fluid leakages between the valve parts and between the valve and the shock absorber reservoir, leads to pressure loss, influencing the behavior of the shock absorber, particularly in low speeds of the vehicle, which can cause loss of control.

The shutters of the known solutions have reduced course, which provokes, even with small displacements, substantial alterations in the behavior of the shock absorber, making difficult to obtain fine variations in the operation of the shock absorber.

SUMMARY OF THE INVENTION

Due to the constructive complexity of the known prior art flow control valves, which are associated with electromagnetic actuators of the on-off type with limiting operation, or of the costly progressive or stepped operation type which is subject to leakages and presents low-sensitive adjustment, it is an object of the present invention to provide a flow control valve for hydraulic shock absorbers presenting a simple, strong, and leak tight construction, which can be adequately operated by different actuators also presenting a simple construction and which are adequate to the provision of a fine adjustment of the control valve operational positions defined by a closed position and a plurality of open positions, for obtaining respective behaviors for the shock absorber, which differ from one another as a result of a fine adjustment of the control valve operation.

It is a further object of the present invention to provide a control valve of the type defined above and which can be operated before or after mounting the shock absorber in the suspension of a wheeled vehicle.

It is also an object of the present invention to provide a control valve of the type defined above and whose operation allows obtaining a decreasing pressure loss of the hydraulic fluid with the increase of its flow through the valve.

It is also an object of the present invention to provide a control valve with the characteristics defined above and which leads to a greater comfort of the passengers of an automobile vehicle, to a better behavior of the vehicle running on roads having a smooth surface or presenting different degrees of surface irregularities, and also to greater stability and safety for vehicles such as buses and trucks under low or high weight.

The present flow control valve is applied in hydraulic shock absorbers of the variable damping type and which comprises: a pressure tube; a piston axially displaceable in the interior of the pressure tube and dividing it in a compression chamber and a traction chamber which are selectively and bi-directionally communicated with each other by means of axial passages provided in the piston; a hydraulic fluid reservoir provided with a selective bidirectional fluid communication with the compression chamber; and a control valve providing a selective unidirectional fluid communication, with a variable section, between the traction chamber and the reservoir. According to the present invention, the flow control valve comprises: a tubular body externally attached to the pressure tube and comprising a regulating chamber provided with an inlet opening maintained in fluid communication with the traction chamber, an outlet chamber maintained in fluid communication with the reservoir by at least one outlet orifice, a control orifice communicating the outlet and regulating chambers to each other, and a guide means coaxial to the control orifice; a shutter pin having a rod portion and a shutter portion presenting a cross section varying along at least part of the longitudinal extension of said shutter portion, said rod and shutter portions being jointly, selectively and axially displaceable in the guide means and in the interior of the control orifice, respectively, between a closing position of the control orifice and a plurality of open positions of the latter, in each of said positions the shutter portion forming, with the control orifice, a respective annular section for the passage of the hydraulic fluid to the reservoir; and an actuator means operatively associated with the shutter pin, so as to axially displace it, in the interior of the control orifice, to said closing and open positions of the control orifice.

The control valve construction defined above permits it to be easily incorporated to the shock absorber structure and also driven between a closed position and a fully open position, passing through different partially open positions, by means of an actuator which can present different strong constructions which are relatively simple to be produced. The shutter pin construction permits it to be reliably and controllably displaced to a high number of operational positions, each corresponding to an operational condition of the shock absorber, which fact leads to a higher sensitivity for adjusting or calibrating the shock absorber.

The control valve construction and its mounting in the hydraulic shock absorber, as proposed by the present invention, also allows obtaining a high degree of tightness for the hydraulic fluid and, accordingly, a better and more precise control over the shock absorber behavior.

BRIEF DESCRIPTION OF THE DRAWINGS

The invention will be described below, with reference to the enclosed drawings, given by way of example of a possible embodiment of the invention, and in which.

DESCRIPTION OF THE ILLUSTRATED EMBODIMENT

Figure 1:
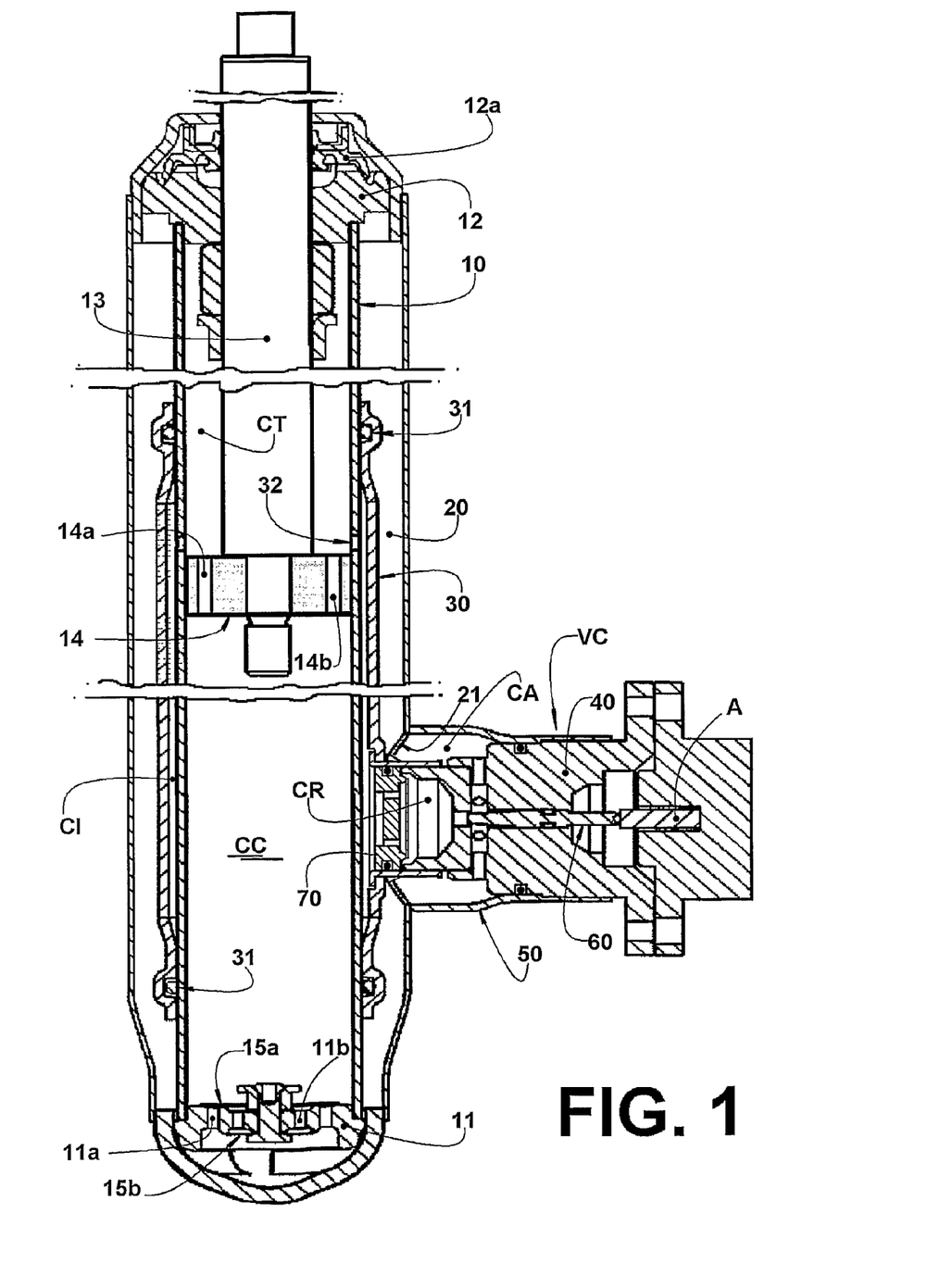
FIG. 1 represents a simplified longitudinal sectional view of a hydraulic shock absorber to which is adapted a control valve constructed according to the present invention and illustrated in a fully open position.

As already previously mentioned, the invention generally refers to double-acting hydraulic shock absorbers, to be used, for example, in the suspension of wheeled vehicles and which comprise a generally cylindrical pressure tube having a lower end closed by a valve plate 11 and with the upper end closed by an annular plate 12 carrying a seal 12a, through which slides a rod 13 having an end external to the pressure tube 10 and an end internal to the latter and coupled to a piston 14, which is axially displaced in the interior of the pressure tube 10, during the operation of the shock absorber.

In a known manner, the piston 14 divides the interior of the pressure tube 10 in a compression chamber CC, adjacent to the valve plate 11, and in a traction chamber CT, adjacent to the annular plate 12.

The valve plate 11 is provided with two sets of axial passages 11a, 11b, communicating the interior of the compression chamber CC with the interior of a hydraulic fluid reservoir 20 which takes the form of a tube surrounding, generally in a coaxial manner, the pressure tube 10. The reservoir 20 has its ends closed by any adequate means well known from the prior art, by using for example the annular plate 12 in one of its ends.

In one of the sets of axial passages 11a of the valve plate 11 is mounted an admission valve 15a, whilst in the other set of axial passages is mounted a discharge valve 15b, said valves being unidirectional, so as to permit, respectively, the passage of the hydraulic fluid from the reservoir 20 to the interior of the compression chamber CC, when the shock absorber is submitted to an expansion or traction movement, and also the passage of the hydraulic fluid from the compression chamber CC to the reservoir 20, when the shock absorber is submitted to a compression movement. In like manner and as well known from the prior art, the piston 14 is provided with two axial passages 14a, 14b, each provided with a respective unidirectional valve (not illustrated), to allow the hydraulic fluid to flow from one chamber to the other, in the interior of the pressure tube 10, upon the movement of the piston 14.

As illustrated, the pressure tube 10 is laterally surrounded by an intermediate tube 30 which forms, with the pressure tube 10 and around this, an intermediate annular chamber CI with ends closed by annular seals 31 and provided with at least one fluid inlet 32 open to the traction chamber CT, through the pressure tube 10, and with a fluid outlet 33 open to the interior of the reservoir 20 and aligned with a radial opening 21 provided in the reservoir 20, which is disposed in a manner to surround the pressure tube 10 and the intermediate tube 30.

With the purpose of allowing the variation of the degree of damping of the shock absorber, a control valve VC is provided, mounted externally to the pressure tube 10, more specifically to the reservoir 20 and constructed in a way to provide a selective fluid communication, with a variable section, between the traction chamber CT and the reservoir 20.

Figure 2:
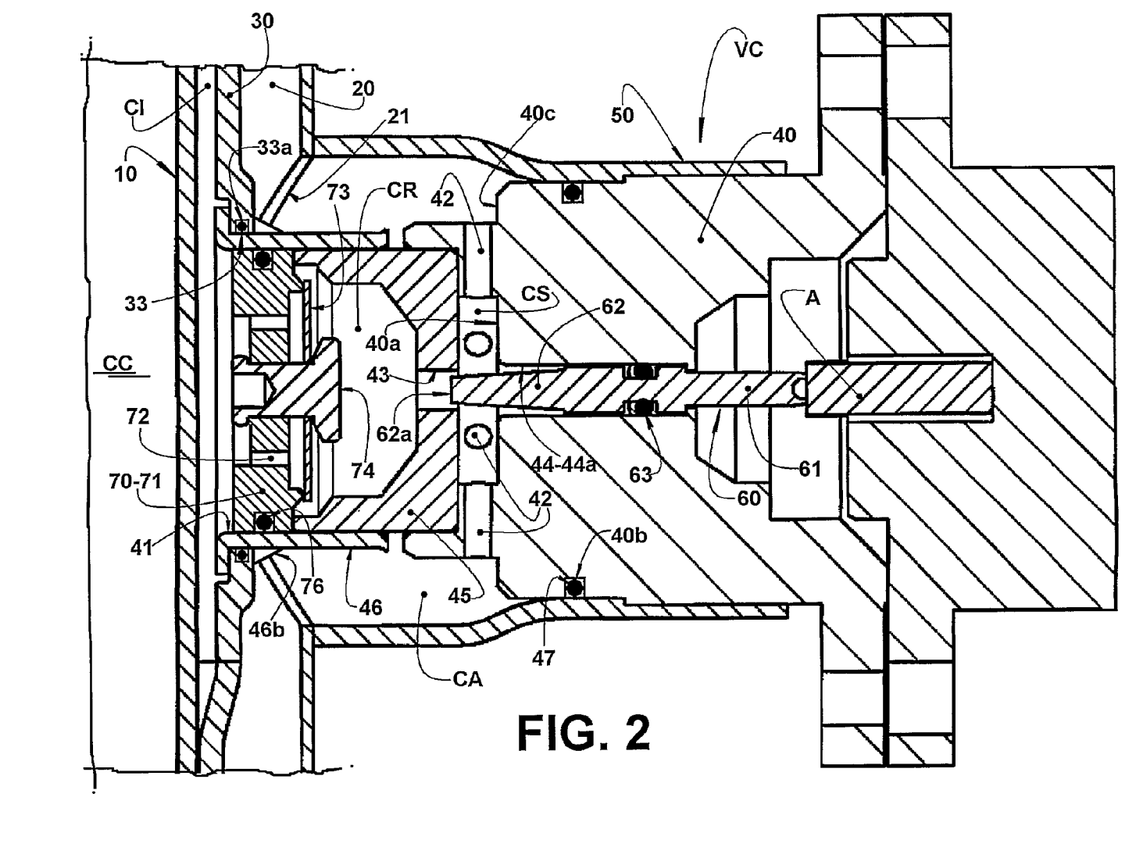
FIG. 2 represents an enlarged detail of the control valve illustrated in FIG. 1, in a fully open position.

According to the invention, the control valve VC comprises a tubular body 40 which, in the illustrated construction, is mounted and axially affixed in the interior of a tubular casing 50 which has a first end hermetically attached, generally by welding, to the reservoir 20, concentrically to the radial opening 21 of the latter, and a second end opposite to the first one and opened to the exterior, the tubular body 40 thus remaining externally attached to the pressure tube 10. The tubular body 40 of the control valve VC comprises: a regulating chamber CR provided with an inlet opening 41, maintained in fluid communication with the traction chamber CT, through the intermediate chamber CI; an outlet chamber CS maintained in fluid communication with the reservoir 20 by means of one or several outlet orifices 42; a control orifice 43 communicating the regulating chamber CR and the outlet chamber CS to each other; and a guide means 44 coaxial to the control orifice 43 and which, in the illustrated construction, takes the form of an axial hole 44a provided through the tubular body 40 and having an end opened to the interior of the outlet chamber CS and an opposite end opened to the outside of the tubular body 40 and operatively coupled to an actuator A which may be, for example, in the form of an actuator of telescopic movement generated by a mechanical positioner, by an electric motor, by a stepped electric motor, or also by any other actuator means which is capable to produce axial displacements in an element to be displaced by the actuator.

The control valve VC further comprises a shutter pin 60, having a rod portion 61 and a shutter portion 62 whose cross section varies along at least part of the longitudinal extension of said shutter portion 62.

The rod portion 61 and shutter portion 62 are generally coaxial and formed in a single piece, with the rod portion 61 being axially displaced by the actuator means A on the guide means 44 which, in the illustrated embodiment is defined by the axial hole 44a of the tubular body 40, whilst the shutter portion 62 is displaced, with a radial gap, in the interior of the control orifice 43, between a full or practically full closing position of the control orifice 43 (not illustrated), and a plurality of open positions of the control orifice 43, in each of said positions the shutter portion 62 forming, with the latter, a respective annular section for the passage of the hydraulic fluid to the reservoir 20.

The rod portion 61 of the shutter pin 60 is provided with at least one circumferential channel 61a, in which is housed a sealing ring 63, generally in elastomer and which cooperates with the inner face of the axial hole 44a of the tubular body 40, to ensure the tightness of the mounting of the shutter pin 60 in the axial hole 44a, preventing the hydraulic fluids from leaking through the latter.

As may be observed through FIGS. 5-8, the shutter portion 62 can be constructed to present a free end region 62a, with a reduced cross section which can be defined as a thin tip (not illustrated) and, in its junction region with the rod portion 61, an annular step 64. With this construction, the shutter portion 62 is disposed through both the outlet chamber CS and the control orifice 43, to be axially displaced, by the actuator means A, between the closed position (not illustrated), in which the annular step 64 is seated against an annular wall portion of the outlet chamber CS defined around the control orifice 43, blocking it completely, and the open positions, in which the annular step 64 is spaced from the control orifice 43, as illustrated in FIG. 2, where the shutter portion 62 is in the valve maximum open position.

In a different way, in the embodiment illustrated in FIGS. 9-12, the shutter portion 62 presents, in its junction with the rod portion 61, a cross section with a substantially reduced contour, so as to define, with the control orifice 43, the largest annular area for the passage of the hydraulic fluid, with the valve fully open. In the free end region 62a, the shutter portion 62 presents a cross section similar to that of the control orifice 43, to form therewith an annular section only sufficient to allow the free axial displacement of the shutter portion 62 in the interior of the control orifice 43. In this constructive variant, the shutter portion 62 is disposed in the interior of both the regulating chamber CR and the control orifice 43, to be axially displaced between the closed position (not illustrated), in which its free end region 62a is positioned in the interior of the control orifice 43, and the open positions (also not illustrated), in which the free end region 62a is displaced outwardly from the control orifice and to the interior of the regulating chamber CR. FIGS. 5-12 illustrate shutter pins 60 with their shutter portion 62 presenting a frusto-conical or generally frusto-conical shape. In the shutter portion 62 of FIG. 5, the free end region 62a defines the smaller base of the frusto-conical shape, whilst in the variant of FIG. 9, the free end region 62a defines the larger base of the frusto-conical shape.

Figure 6:
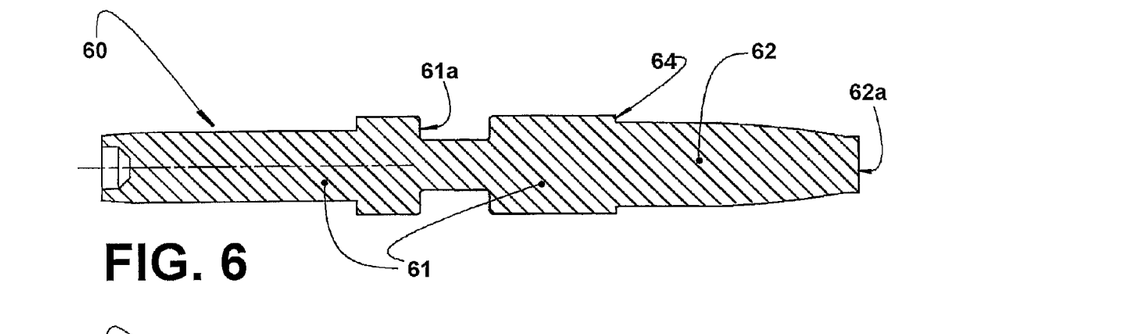
Figure 7:
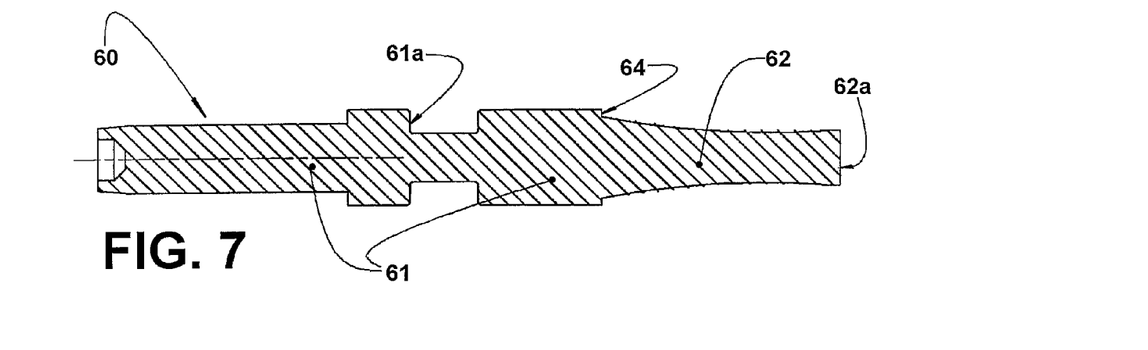
Figure 8:
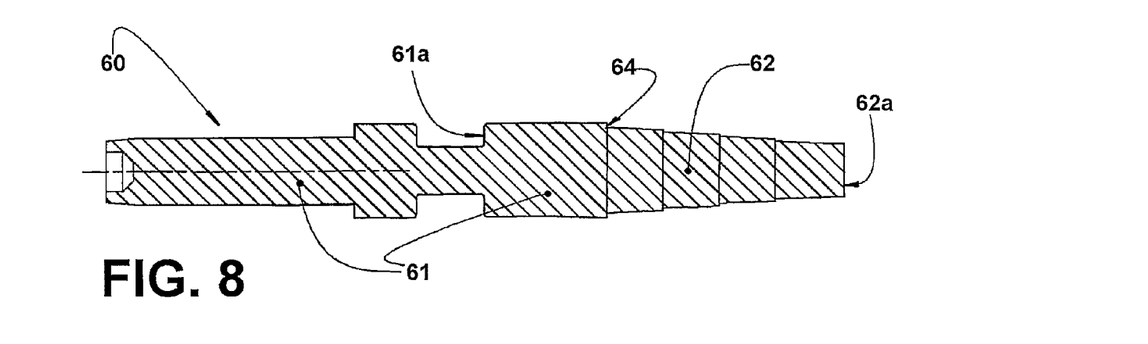
Figure 9:
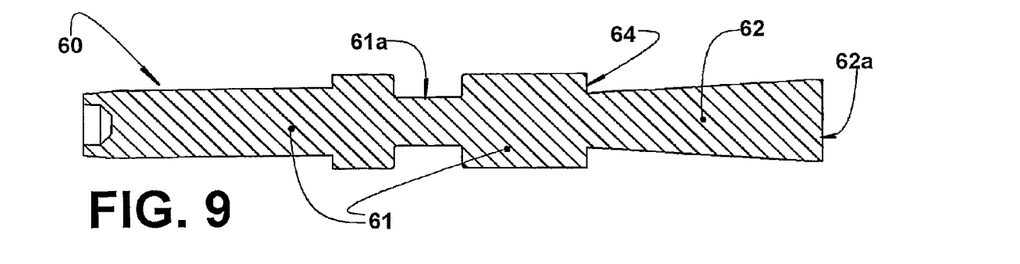
Figure 10:
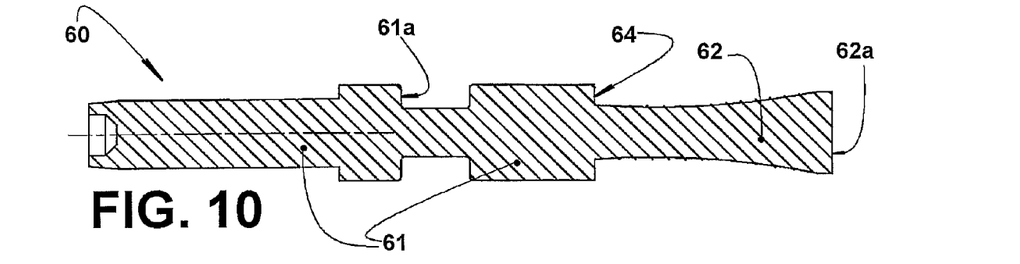
Figure 11:
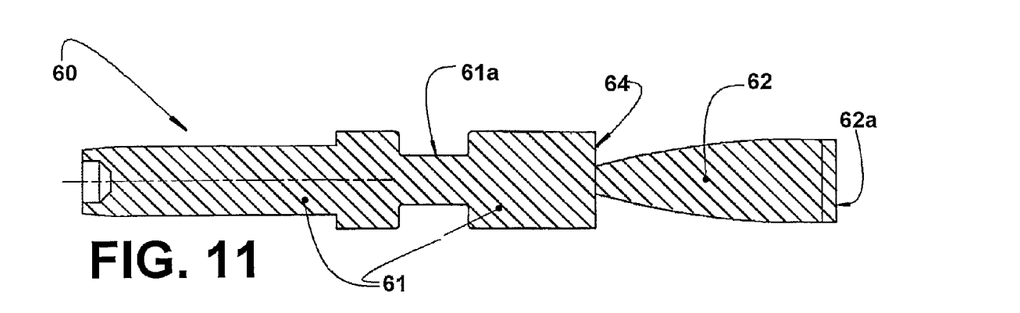
Figure 12:
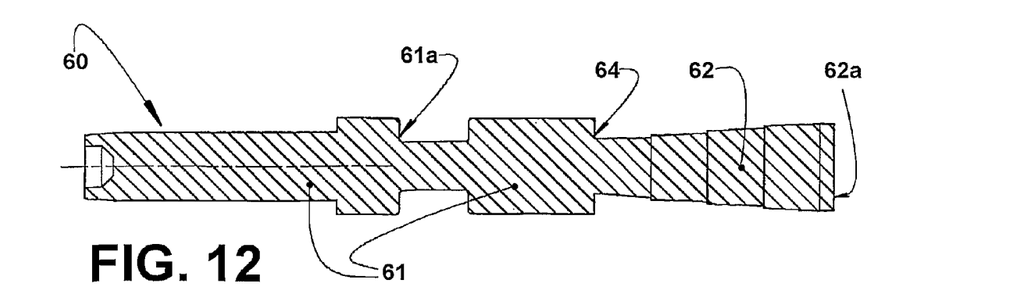

As illustrated herein, the substantially frusto-conical shape of the shutter portion 62 can be obtained by different ways, having its side surface formed by the revolution of a generatrix defined: by a straight line, forming the frusto-conical shape illustrated in FIGS. 5-9; by a curved line in a convex or concave arc, as illustrated in FIGS. 6 and 11 and also in FIGS. 7 and 10, respectively; a plurality of straight or curved line segments connected to each other by radial steps, or also a combination of these generatrices, aiming to obtain a certain reaction behavior of the shock absorber for the different operational positions of the shutter portion 62 in the interior of the control orifice 43.

In the construction illustrated in the drawings, the regulating chamber CR presents a tubular configuration, having an open end defining the inlet opening 41 and the opposite end closed and axially trespassed by the control orifice 43.

The regulating chamber CR can be defined in the interior of a tubular insert 45 having a closed end seated and affixed against an end of the tubular body 40, the outlet chamber CS being defined in the interior of an end cylindrical recess 40a of the tubular body 40, which recess is frontally closed by the closed end of the tubular insert 45. In the illustrated construction, the open end of the regulating chamber CR is defined in a plane parallel to the axis of the pressure tube 10 and adjacent to the latter, allowing to define the inlet opening 41 in communication with the interior of the intermediate chamber CI.

The outlet chamber CS presents the cylindrical shape of the end cylindrical recess 40a of the tubular body 40 and is disposed adjacently and coaxially to the regulating chamber CR. In this construction, the tubular body 40 is provided with a plurality of radially disposed outlet orifices 42, communicating the interior of the outlet chamber CS with the exterior of the tubular body 40. It should be understood that the outlet chamber CS may present other shapes, which can be easily obtained through the process of forming the tubular body 40 and the regulating chamber CR.

According to the illustrated construction, the regulating chamber CR is defined in the interior of the tubular insert 45 and of a prolonging sleeve 46 which is mounted and attached, in a hermetic and tight manner, around the open end portion of the tubular insert 45, and presenting a free end which defines the inlet opening 41 of the regulating chamber CR.

As already aforementioned, the tubular casing 50 has its first end externally attached to the reservoir 20, concentrically surrounding the radial opening 21 of the reservoir 20 and radially projecting from the latter. The tubular body 40 is hermetically attached in the interior of the tubular casing 50, by seaming or by any other adequate means, generally using at least one sealing ring housed in a circumferential channel 40b externally provided in the tubular body 40 and cooperating with the adjacent inner circumferential portion of the tubular casing 50.

The mounting of the tubular body 40 in the interior of the tubular casing 50 is made so that the open end of the regulating chamber CR, which in the illustrated embodiment is defined by the free end of the prolonging sleeve 46, can be hermetically attached to the intermediate tube 30, peripherally to the fluid outlet 33 of the intermediate chamber CI and passing, with a radial gap, through the radial opening 21 of the reservoir 20. The proposed construction makes the tubular body 40 occupy the whole inner cross section of the tubular casing 50, sealing the free end of the latter, through which the actuator means A is operatively coupled to the shutter pin 60. However, in the region of the outlet chamber CS and regulating chamber CR, the tubular body 40 presents a reduced outer diameter, making these two chambers define, with the tubular casing 50, an annular chamber CA with an end closed by the peripheral annular step 40c itself, which increases the diameter of the tubular body 40, and with the opposite end opened to the interior of the reservoir 20, through its radial opening 21. Thus, the outlet orifices 42 of the outlet chamber CS are open to the interior of the annular chamber CA and, consequently, to the interior of the reservoir 20.

As illustrated in FIG. 2, the open end of the regulating chamber CR, more specifically the open end of the prolonging sleeve 46, is introduced through the outlet opening 33 of the intermediate chamber CI and radially outwardly bent and seamed internally to the intermediate tube 30, two outer flanges 46b being further provided, radially externally incorporated to the prolonging sleeve 46 or to the other outer portion of the regulating chamber CR and to be seated, acting as fitting limiting stops, externally to the intermediate tube 30, according to a longitudinal direction.

In order to ensure a higher tightness degree of the mounting of the regulating chamber CR to the intermediate tube 30, the outlet opening 33 of the latter may be provided with a sealing ring 33a, generally in elastomer and actuating against the adjacent wall portion of the regulating chamber CR.

Figure 3:
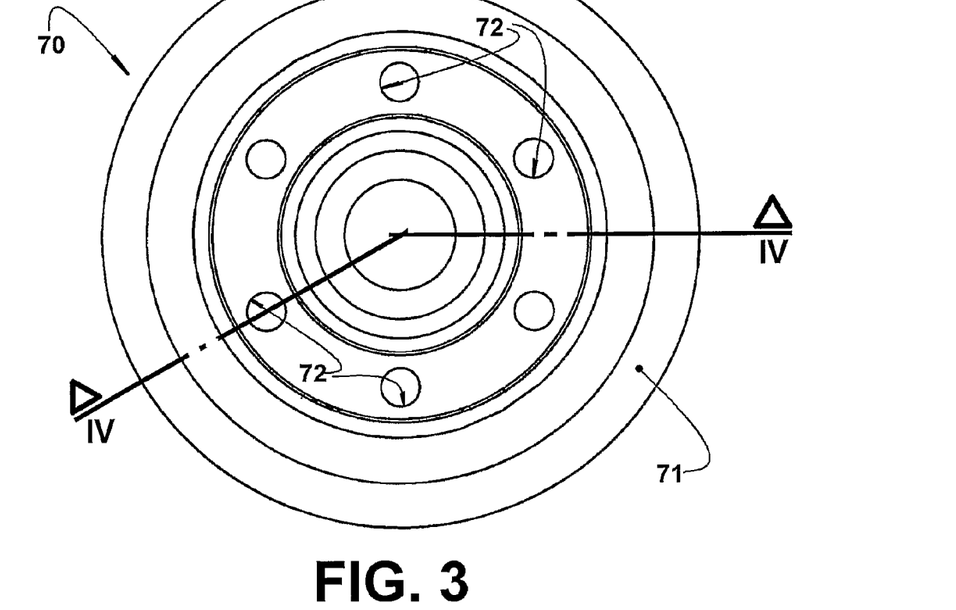
FIG. 3 represents a top plan view of the cylindrical body of a compensating valve to be mounted in the interior of the regulating chamber.
Figure 4:
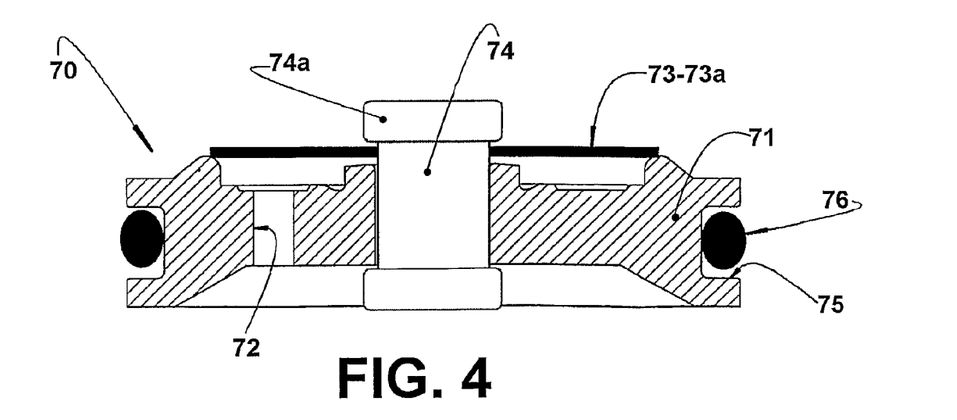
FIG. 4 represents a sectional view of the cylindrical body of the regulating valve, illustrated in FIG. 3, said section being taken according to line IV-IV in said previous figure and also illustrating a metallic vane, in the form of a laminar disk, which is centrally affixed to the cylindrical body by a riveted pin and illustrated in the closed position.
Figure 5:
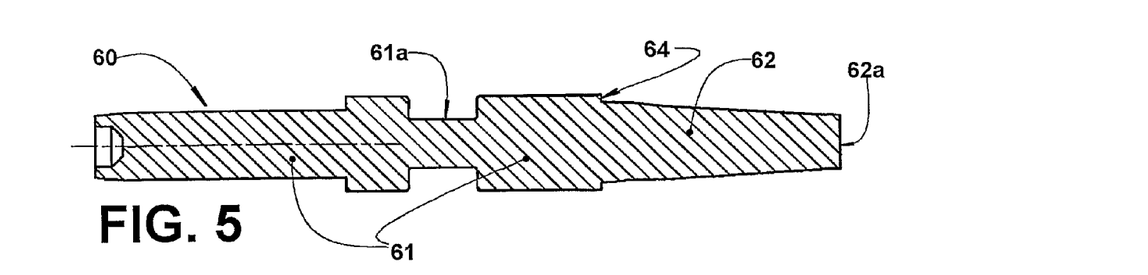
FIGS. 5-12 illustrate longitudinal sectional views of different exemplary constructive embodiments for the shutter pin.

With the purpose of maintaining a decreasing curve in the pressure loss of the hydraulic fluid passing through the control valve VC, upon the raise of the hydraulic fluid flowrate therethrough, said valve is also provided with a compensating valve 70, mounted in the interior of the regulating chamber CR, between the inlet opening 41 and the control orifice 43, and having a cylindrical body 71 which is: peripherally and hermetically seated against the prolonging sleeve 46; axially seated against the free end of the tubular insert 45; provided with one or several axial passages 72; and carrying at least one metallic vane 73 which is elastically deformable, as a function of the pressure of the hydraulic fluid upstream the respective axial passage 72, between a closed position in which it restricts, in a certain high degree, the hydraulic fluid flow through the respective axial passage 72, and a fully open position, in which it restricts, in a substantially lower degree, the hydraulic fluid flow through said axial passage 72.

In the illustrated construction, the prismatic body 71 is provided with a plurality of axial passages 72, spaced from each other along a median circular alignment, the metallic vane 73 being defined by one or more laminar disks 73a arranged coaxially overlapped to each other, covering all the axial passages 72 and being centrally affixed to the prismatic body 71, so as to have their outer annular region, which cooperates with the axial passages 72, deflectable between the closed and fully open positions.

The fixation of one or more laminar disks 73a to the prismatic body 71 can be made by a central rivet 74, having an end 74a configured to define a stop for limiting the opening of the laminar disk.

In order to ensure the tightness of the mounting of the compensating valve 70 in the interior of the regulating chamber CR, the prismatic body 71 of said compensating valve is provided with at least one peripheral channel 75 which houses an elastic sealing ring 76, generally in elastomer and which cooperates with an adjacent inner peripheral region of the regulating chamber CR. In the illustrated constructive example, the elastic sealing ring 76 cooperates with the prolonging sleeve 46, the prismatic body 71 being axially seated against the free end of the tubular insert 45.

Although only one embodiment of the invention has been illustrated herein, it should be understood that alterations can be made in the form and arrangement of the different component parts of the control valve, without departing from the constructive concept defined in the claims accompanying the present specification.

The invention claimed is:

1. A flow control valve for hydraulic shock absorbers of the variable damping type and which comprises:
   a pressure tube;
   a piston displaceable in the interior of the pressure tube and dividing it in a compression chamber (CC) and a traction chamber (CT) which are selectively and bi directionally communicated to each other by means of axial passages provided in the piston;
   a hydraulic fluid reservoir, provided with a selective bidirectional fluid communication with the compression chamber (CC); and
   a control valve (VC) providing a selective unidirectional fluid communication, with a variable section, between the traction chamber (CT) and the reservoir, said control valve (VC) being characterized in that it comprises:
      a tubular body externally attached to the pressure tube (10) and comprising a regulating chamber (CR) provided with an inlet opening maintained in fluid communication with the traction chamber (CT),
      an outlet chamber (CS) maintained in fluid communication with the reservoir by at least one outlet orifice,
      a control orifice communicating the regulating chamber (CR) and the outlet chamber (CS) to each other, and
      a guide means coaxial to the control orifice;
      a shutter pin having a rod portion and a shutter portion with a cross section varying along at least part of a longitudinal extension of said shutter portion, said rod portion and shutter portion being jointly, selectively and axially displaceable in the guide means and in the interior of the control orifice, respectively, between a closing position of the control orifice and a plurality of open positions of the latter, in each of said positions the shutter portion forming, with the control orifice, a respective annular section for the passage of the hydraulic fluid to the reservoir; and an actuator means (A) operatively associated with the shutter pin in order to axially displace it, in the interior of the control orifice, to said closing and opening positions of the control orifice.

2. The flow control valve, as set forth in claim 1, characterized in that the regulating chamber (CR) presents a tubular configuration, with an open end defining an inlet opening, and with the opposite end closed and axially trespassed by the control orifice.

3. The flow control valve, as set forth in claim 2, characterized in that the regulating chamber (CR) is defined in the interior of a tubular insert with a closed end seated and attached against an end of the tubular body, the outlet chamber (CS) being defined in the interior of an end cylindrical recess of the tubular body, frontally closed by the closed end of the tubular insert.

4. The flow control valve, as set forth in claim 3, characterized in that the regulating chamber (CR) is defined in the interior of the tubular insert and of a prolonging sleeve which is mounted and attached, in a tight and hermetic manner, around the open end portion of the tubular insert and having a free end which defines the inlet opening of the regulating chamber (CR).

5. The flow control valve, as set forth in claim 4, characterized in that it further comprises a compensating valve mounted in the interior of the regulating chamber (CR) between the inlet opening and the control orifice and having a prismatic body provided with at least one axial passage and carrying at least one respective metallic vane which is elastically deformable, as a function of the pressure of the hydraulic fluid upstream the axial passage, between a closed position in which it restricts, in a certain high degree, the hydraulic fluid flow through the axial passage, and a fully open position in which it restricts, in a substantially lower degree, the hydraulic fluid flow through the axial passage.

6. The flow control valve, as set forth in claim 5, characterized in that the prismatic body of the compensating valve is provided with a plurality of axial passages arranged spaced from each other along a median circular alignment, the metallic vane, associated with each axial passage, being defined by at least one laminar disk covering all the axial passages and being centrally affixed to the prismatic body, so as to have its outer annular region, which cooperates with the axial passages, deflectable between the closed and fully open positions.

7. The flow control valve, as set forth in claim 6, characterized in that the laminar disk is affixed to the prismatic body by a central rivet, having an end configured to define a stop for limiting the opening of the laminar disk.

8. The flow control valve, as set forth in claim 5, characterized in that the prismatic body is provided with at least one peripheral channel housing an elastic sealing ring cooperating with an adjacent inner peripheral region of the regulating chamber (CR).

9. The flow control valve, as set forth in claim 2, characterized in that the open end of the regulating chamber (CR) is defined in a plane parallel to the axis of the pressure tube and adjacent to the latter.

10. The flow control valve, as set forth in claim 2, characterized in that the outlet chamber (CS) presents a cylindrical shape and is disposed coaxially and adjacently to the regulating chamber (CR), said tubular body being provided with a plurality of radially disposed outlet orifices communicating the interior of the outlet chamber (CS) with the exterior of the tubular body.

11. The flow control valve, as set forth in claim 2, the pressure tube being laterally surrounded by an intermediate tube which forms, with said pressure tube 10, an intermediate annular chamber (CI) with closed ends and provided with at least one fluid inlet opened to the interior of the traction chamber (CT) through the pressure tube, and with a fluid outlet through the intermediate tube and opened to the interior of the reservoir, the pressure tube and the intermediate tube being mounted in the interior of the tubular reservoir, the control valve (VC) being characterized in that the tubular body is hermetically mounted and attached in the interior of a tubular casing, having a first end hermetically attached to the reservoir, around a radial opening of the latter, and a second opposite open end, the regulating chamber (CR) of the tubular body having its open end hermetically affixed to the intermediate tube, peripherally to the fluid outlet of the intermediate chamber (CI) and passing, with a radial gap, through the radial opening of the reservoir, said regulating chamber (CR) and outlet chamber (CS) defining, with the tubular casing, an annular chamber (CA) with an end closed by the tubular body and with an opposite end opened to the radial opening of the reservoir, the outlet orifice of the outlet chamber (CS) being open to the interior of the annular chamber (CA).

12. The flow control valve, as set forth in claim 11, characterized in that the open end of the regulating chamber (CR) is seamed internally to the intermediate tube, through the outlet opening of the intermediate chamber (CI), said regulating chamber (CR) incorporating two outer flanges seated externally to the intermediate tube.

13. The flow control valve, as set forth in claim 12, characterized in that the outlet opening of the intermediate chamber (CI), which is defined in the intermediate tube, carries a sealing ring actuating against the adjacent wall portion of the regulating chamber (CR).

14. The flow control valve, as set forth in claim 11, characterized in that the tubular body is externally provided with a circumferential channel housing a sealing ring which cooperates with the tubular casing.

15. The flow control valve, as set forth in claim 1, characterized in that the shutter portion presents a generally frusto-conical shape, with the free end region defining one of the larger and smaller bases of the cited shape.

16. The flow control valve, as set forth in claim 15, characterized in that the shutter portion, of a generally frusto-conical shape, presents its side surface formed by the revolution of one of the generatrices selected from a straight line, a plurality of straight or curved line segments connected by radial steps, a concave arc, a convex arc, and combinations thereof.

17. The flow control valve, as set forth in claim 1, characterized in that the shutter portion presents, in its junction with the rod portion, a cross section with a substantially reduced contour and, in a free end region, a cross section similar to that of the control orifice, in order to form therewith an annular section only sufficient to allow the free axial displacement of the shutter portion in the interior of the control orifice, said shutter portion being disposed in the interior of the regulating chamber (CR) and of the control orifice and displaceable between the closed position, in which its free end region is positioned in the interior of the control orifice, and the open positions, in which said free end region is displaced outwardly from the control orifice, to the interior of the regulating chamber (CR).

* * * * *